United States Patent [19]

Kruder

[11] Patent Number: 5,035,509
[45] Date of Patent: Jul. 30, 1991

[54] MULTI-CHANNEL EXTRUSION SCREW WITH A ZIG-ZAG UNDERCUT BARRIER

[75] Inventor: George A. Kruder, Mount Gilead, Ohio

[73] Assignee: HPM Corporation, Mount Gilead, Ohio

[21] Appl. No.: 566,483

[22] Filed: Aug. 13, 1990

[51] Int. Cl.⁵ .............................................. B29B 7/42
[52] U.S. Cl. .................................... 366/89; 264/349; 366/90; 425/208
[58] Field of Search ..................... 366/79, 88, 89, 90; 425/200, 207, 208; 264/349

[56] References Cited

U.S. PATENT DOCUMENTS

| | | | |
|---|---|---|---|
| 3,271,819 | 9/1966 | Lacher | 366/89 |
| 3,698,541 | 10/1972 | Barr | 366/88 |
| 3,870,284 | 3/1975 | Kruder | 256/191 |
| 4,092,015 | 5/1978 | Koch | 366/81 |
| 4,131,368 | 12/1978 | Iddon | 366/81 |
| 4,173,417 | 11/1979 | Kruder | 366/89 |
| 4,215,978 | 8/1980 | Takayama et al. | 425/190 |
| 4,405,239 | 9/1983 | Chung et al. | 366/89 |
| 4,896,969 | 1/1990 | Dray | 366/89 |
| 4,925,313 | 5/1990 | Nunn | 366/90 |
| 4,944,906 | 7/1990 | Colby et al. | 366/89 |

FOREIGN PATENT DOCUMENTS

| | | | |
|---|---|---|---|
| 57-84830 | 5/1982 | Japan | 366/90 |
| 60-242013 | 12/1985 | Japan | 366/90 |
| 61-141513 | 6/1986 | Japan | 366/79 |

*Primary Examiner*—Jay H. Woo
*Assistant Examiner*—William J. Matney, Jr.
*Attorney, Agent, or Firm*—Jeffers, Hoffman & Niewyk

[57] ABSTRACT

A plasticating apparatus having a barrel and a screw rotatably disposed therein. The screw has a mixing section including a helical conveying flight to form a helical passage for transporting resinous material along the screw. The mixing section further includes a helical, zig-zag barrier flight spaced from the conveying flight to divide the helical passage into channels of varying cyclic depth in the helical direction of the channels. The portions of minimum depth of the channels define wave crests which are helically displaced from each other. The barrier flight has a first section converging toward one side of the conveying flight, and a second segment diverging away from the same side of the conveying flight. The plurality of first and second segments repeat throughout the mixing section.

16 Claims, 2 Drawing Sheets

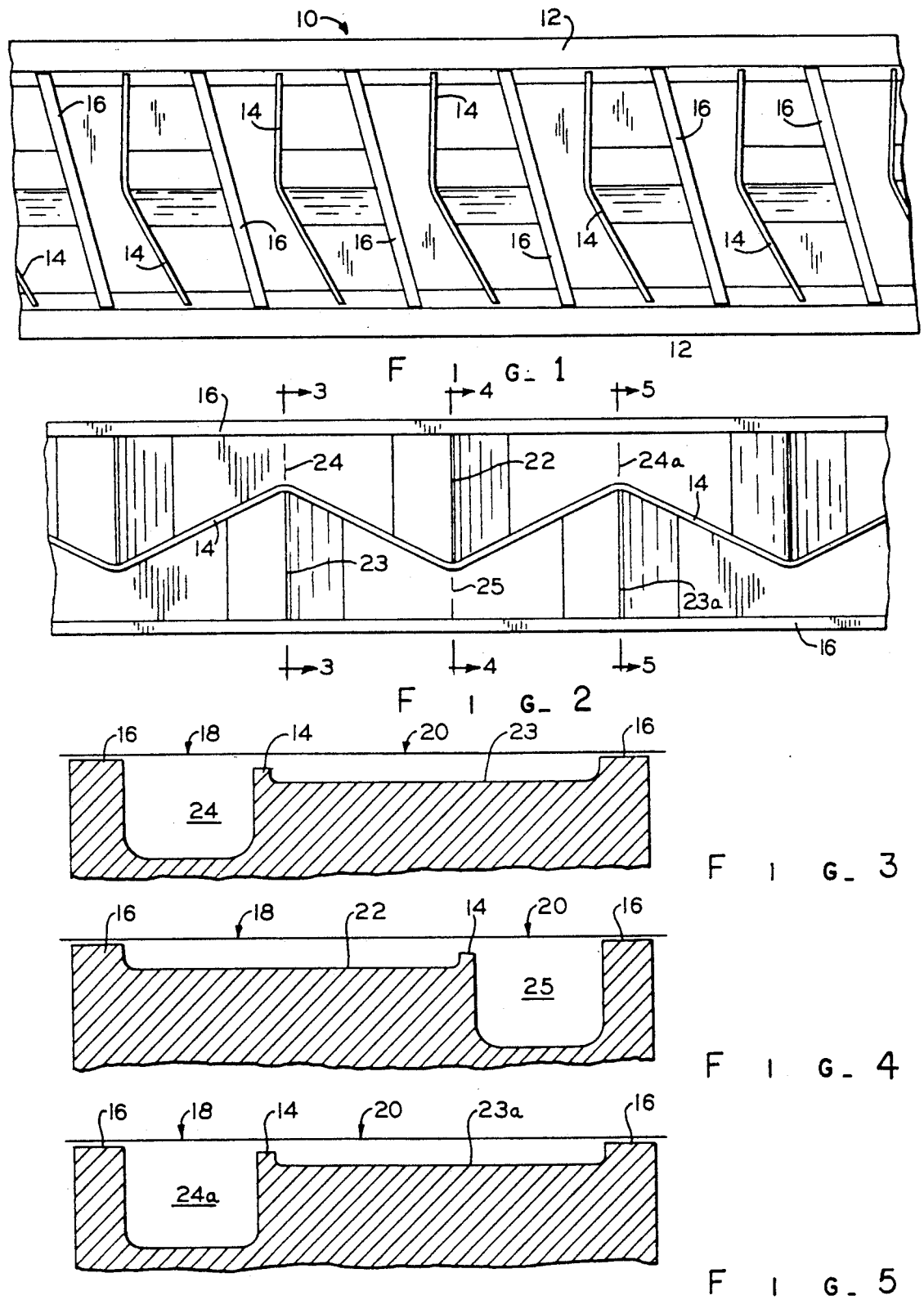

MULTI-CHANNEL EXTRUSION SCREW WITH A ZIG-ZAG UNDERCUT BARRIER

BACKGROUND OF THE INVENTION

This invention relates to extruders of the type in which a screw rotatable within a barrel is employed to extrude material to a die or injection mold connected to the outlet end of the barrel. The invention is concerned particularly with improvements in high output plasticating extruders. This is an improvement on the invention described in my U.S. Pat. No. 4,173,417 issued Nov. 6, 1979.

A plasticating extruder receives polymer pellets or powder (often together with formulation additives in liquid or particle form), works and raises the temperature of the polymer sufficiently to dispose it in a melted or plastic state, and delivers the melted polymer under pressure through a restricted outlet or die. Ordinarily, it is desirable that the discharge extrudate be fully melted, well mixed, uniform in temperature and pressure, and substantially free of small gels and other fine structure agglomerations. It is also desirable that the rate of delivery of the molten polymer through the die be regulated simply by changing the rate of extruder screw rotation and that the rate of delivery at the selected screw speed be substantially uniform.

The basic extruder apparatus includes an elongated barrel which may be heated or cooled at various locations along its length and a screw which extends longitudinally through the barrel. The screw has a helical conveying land on its surface which cooperates with the cylindrical internal surface of the barrel to define an elongated helical channel.

An extruder screw ordinarily has a plurality of sections which are configurations specifically suited to the attainment of particular functions. Examples are "feed" sections and "metering" sections, which are of basic importance and are present in nearly all plasticating extruders for handling thermoplastic polymers.

A typical extruder screw feed section extends beneath and forwardly from a feed opening where polymer in pellet or powder form is introduced into the extruder to be carried forward along the inside of the barrel by the feed section of the screw. As the material is advanced along the channel, it is worked. This, in turn, generates heat, and melting of the polymer occurs as the material is moved along the feed section and later sections of the screw. Actually, most of the melting typically occurs near the surface of the barrel at the interface between a thin melt film and a solid bed of polymer. This general pattern persists until a substantial portion of the polymer reaches the melted state. It is usually advantageous to employ a tapered transition section between the relatively deep feed section and the shallower metering section. Prior to solid bed breakup, this keeps the solid bed width larger and more tightly pressed against the barrel wall, thereby enhancing the melting rate. After some 40% to 70% of the polymer has been melted, solid bed breakup usually occurs, and at this time particles of solid polymer become disbursed in the polymer melt.

An extruder screw metering section has as its special function the exertion of a pumping action on the molten polymer. Ordinarily, the throughput achieved by a screw is thought of as being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. Stated in another way, the drag flow is the volumetric pumping capacity, the latter being a function only of screw channel dimensions times screw rpm. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but of course it may affect such factors as back pressure and material viscosity, which factors, in turn, affect significantly the pressure flow component. On the other hand, pressure flow is directly affected by both the depth and length of the screw channel; an increase in channel depth has a tendency to increase greatly the pressure flow component and an increase in channel length has a tendency to reduce this back flow component.

In order to better understand the benefits of the present invention, it is helpful to briefly consider recent developments in the art aimed at optimizing extrudate production. In particular, developments have been aimed at increasing the rate of mixing and circulating melt and solid material.

Traditionally, melting was believed to be most efficient when it can be made to follow the "Tadmor Melting Model", which requires the solid bed to remain unbroken in the front of the channel, while a melt pool collects in the back. In this model, most of the melting takes place in a thin melt film between the solid bed (rotating with the screw) and the stationary barrel.

For conventional screws, the solid bed exists for much of the melting distance, as can be demonstrated by a technique often referred to as "screw pushouts". The technique involves bringing an extrusion operation to steady state condition and then abruptly stopping the process. Cooling water is then immediately circulated on the outside barrel wall and inside the full length of the screw. Later, the barrel wall is heated a short time slightly above the polymer melting point. Finally, the screw is pushed out of the barrel. Then, at every turn of the screw, the contents of the channel are cross-sectioned, revealing visually the distribution of solid particles and melt.

As a result of published screw pushout pictures and interpretations, mathematical melting equations have been developed to serve as a basis for computer programs by Tadmor and Klein and others to simulate screw performance. According to well-known publications on extrusion processing and computer simulation, the ideal screw was supposedly obtained by computer simulation of performance within various combinations of feed, meter, and transition section lengths, depths, pitch, diameter, and operating conditions. Solid bed breakup was considered very bad; therefore, the conventional wisdom was to minimize solid bed breakup until melting was almost complete.

Subsequently, it has been recognized that solid bed breakup for single screw extruders is often highly beneficial. By performing lab extrusions with frequent "pushouts" and comparing the results with computer simulations, it has been noted that examples of early solid bed breakup for some screws show favorable results when subjected to favorable mixing conditions.

Concurrently, it was recognized that a very high rate of melting under these favorable mixing conditions occurs only after melting is about 40% complete, and in the quick melting region, the solid bed is extremely broken up.

Other studies have utilized a revised version of the original Tadmor and Klein computer program to predict the correct melting length of a melt decompression screw. At the shallow downstream end of a tapered compression section, the channel depth of the meter section is suddenly made much deeper in a melt decompression screw similar to the downstream end of a single wave "bump". However, the computer program computed a drastically different percent of melt at the "bump" than observed in the screw pushouts. The pushouts revealed much slower rates of melting in the tapered transition followed by an extremely fast rate of melting and widely disorganized solids distribution in the vicinity of the "bump".

Subsequently, a pushout from a two stage vented polypropylene screw was examined. It showed melting up to the end of the metering section, followed by a much faster rate of melting in the decompressed vent area. This result was unexplainable, even by computer programs.

It was determined to not rely on the metering section design alone to estimate output except where the section is sufficiently long to dominate the pumping characteristic. In general it takes at least several constant depth turns in the metering section channel to strongly influence the output. Thus, it is beneficial to replace the whole length of a metering section with repetitive cyclic waves, in which each repeating wave cycle reinforces the pumping characteristic of the first in the same manner as each turn at constant depth would reinforce the first.

This led to the single channel wave design described in U.S. Pat. No. 3,870,284, where the constant depth metering section was replaced with repetitive cyclic waves. By utilizing small diameter single wave screws, compression at the high wave crests followed by mixing after each decompression increases the melting rate and promotes heat transfer from the melt to the solid. Because of efficient melting, decreased pressure surging and increased rates of production result.

One problem especially for larger diameter single channel wave screws is that solids may obstruct passage at the wave crests. To solve this problem, a central undercut barrier between out-of-phase cyclic waves has been used to create two helical channels so that a solid-rich fraction of the polymer "jams up" into the wave crest while a melt-rich fraction escapes into the deep channel region across the undercut barrier. Such a design assures greater pressure and output uniformity because at the approach to each wave crest, the melt hydraulic pressure is in direct communication with a deep channel section across the undercut central barrier. Furthermore, there is more sideways mixing and less restrictive wave crest squeezing.

It has also been established that a twin channel wave meter section can be preceded by a solids/melt separation design in the transition section to enhance additional melting prior to entering the double wave. A single or twin channel wave can be used in the transition section before entering the metering section, but the value of the double wave principle has been questioned until melting is at least 40% complete. It has been noted that a twin channel wave followed by a mixing tip can withstand much higher extrusion rates than a conventional screw with mixing tip. This is partly because at high speeds, the twin channel wave still melts most, if not all, of the throughput.

In the above-referenced patents there is described an extruder screw whose metering section includes one or more channels following a wave-like cyclical pattern wherein each channel includes periodic wave peaks. The wave portion of the screw performs both metering and mixing functions. Insofar as metering or pumping is concerned, the cyclic wave pattern functions like conventional long metering sections of constant depth in the sense of providing uniform output approximately proportioned to screw rotational speed and providing normal resistance to pressure flow in a rearward direction along the screw channel.

In addition to its good metering properties, the wave portion of the screw has the advantage of achieving good mixing of the polymer without generating excessive heat. In regions of the wave crests, the material is subject to relatively high shear forces so that incompletely melted polymer will be worked and mixed vigorously with the molten material. The material passes from each zone of high shearing action into an adjacent zone of increased channel depth where the heat generating effects are much less intense.

The twin channel wave screw design with a constant pitch undercut barrier has performed effectively to produce high quality melt. Notwithstanding the successful performance, efforts are continuously directed toward increasing the rate of extrudate production.

It has been heretofore proposed in U.S. Pat. No. 4,215,978, issued Aug. 5, 1980 to Takayama et al, in an effort to intensify melting and mixing of extrudate, to provide a plurality of barriers, each crossing a dividing line extending along the screw flight, wherein the dividing line divides the bottom surface of the valley into a plurality of portions along the screw flight. The plurality of barriers form a dam between one hill and the opposite hill at the bottom of the screw for preventing intercommunication of the valleys of the divided portions. In addition, each barrier has one edge line extending from one hill and terminating in the hill side of the opposite hill to form one cross point. The barriers are inclined at an angle with respect to the screw flight such that one of the angularly adjacent dams lies in a mutually intersecting direction with the other. Proposals such as this do not effectively deal with the problems of overheating, especially due to the rather long wave peaks created by the barriers. In addition, such proposals do not achieve the metering output stability that is commonly experienced in twin channel wave screws.

SUMMARY OF THE INVENTION

The present invention overcomes the disadvantages of the above-described prior art by providing an extruder screw having a mixing section, including a helical conveying flight and a zig-zag shaped helical barrier flight, which forms a pair of helical flow channels, each channel being of varying depth to form repeating wave cycles. More particularly, the helical barrier flight extends across the screw in a cyclical zig-zag shape, wherein a first segment of the barrier flight converges toward one side of the conveying flight, and wherein a second segment of the barrier flight diverges away from the same side of the conveying flight, and wherein the first and second segments repeat throughout the mixing section.

An advantage of the multi-channel extrusion screw with a zig-zag undercut barrier is that the rate of extrudate production can be significantly increased within an acceptable range of maximum temperature and temperature fluctuations.

Yet another advantage of the present invention is that the wave crests are widened to accommodate more throughput with a shallower wave crest depth.

Another advantage of the present invention is that the mixing and circulation of melted and unmelted materials is increased.

A further advantage of the present invention is that the rate of extrudate production is maximized while maintaining acceptable temperature and pressure parameters at the screw tip.

A still further advantage of the present invention is that the occurrence of pressure pulses during extrudate feeding is minimized.

The invention, in one form thereof, comprises a rotating screw disposed within a barrel and being adapted for plasticating resinous material fed into the barrel. The screw has a helical passage formed by a conveying flight to transport the resinous material along the screw. The screw also has a section for mixing and melting the resinous material. The section includes a helical, zig-zag barrier flight spaced from the conveying flight to divide the helical passage into channels of varying cyclic depth in the helical direction of the channels. The portions of minimum depth of the channels define wave crests which are helically displaced from each other. The barrier flight has a first segment converging toward one side of the conveying flight, and a second segment diverging away from the same side of the conveying flight. The plurality of first and second segments repeat throughout the mixing section.

The invention, in one form thereof, comprises a rotating screw disposed within a barrel and being adapted for plasticating resinous material fed into the barrel. The screw has a helical passage formed by a conveying flight to transport the resinous material along the screw. The screw also has a section for mixing and melting the resinous material. The section includes a helical, zig-zag barrier flight spaced a from the conveying flight to divide the helical passage into channels of varying cyclic depth in the helical direction of the channels. The portions of minimum depth of the channels define wave crests which are helically displaced from each other. Similarly, portions of maximum depth of the channels define valleys which are helically displaced from each other. The width of each channel is defined by the barrier flight and one side of the conveying flight. The width of each of the channels cyclically decreases from each wave crest to its adjacent downstream valley. Likewise, the width of each of the channels cyclically increases from each valley to its adjacent downstream wave crest.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings, wherein:

FIG. 1 is a fragmentary, partially sectioned side elevational view of an extruder barrel and screw embodying a wave section in accordance with the present invention;

FIG. 2 is an unwrapped channel view of a portion of the wave section depicted in FIG. 1;

FIG. 3 is an enlarged cross-sectional view of the extruder screw of FIG. 2, taken along line 3—3;

FIG. 4 is an enlarged cross-sectional view of the extruder screw of FIG. 2, taken along line 4—4;

FIG. 5 is an enlarged cross-sectional view of the extruder screw of FIG. 2, taken along line 5—5.

DETAILED DESCRIPTION OF A PREFERRED EMBODIMENT

Figure 6:
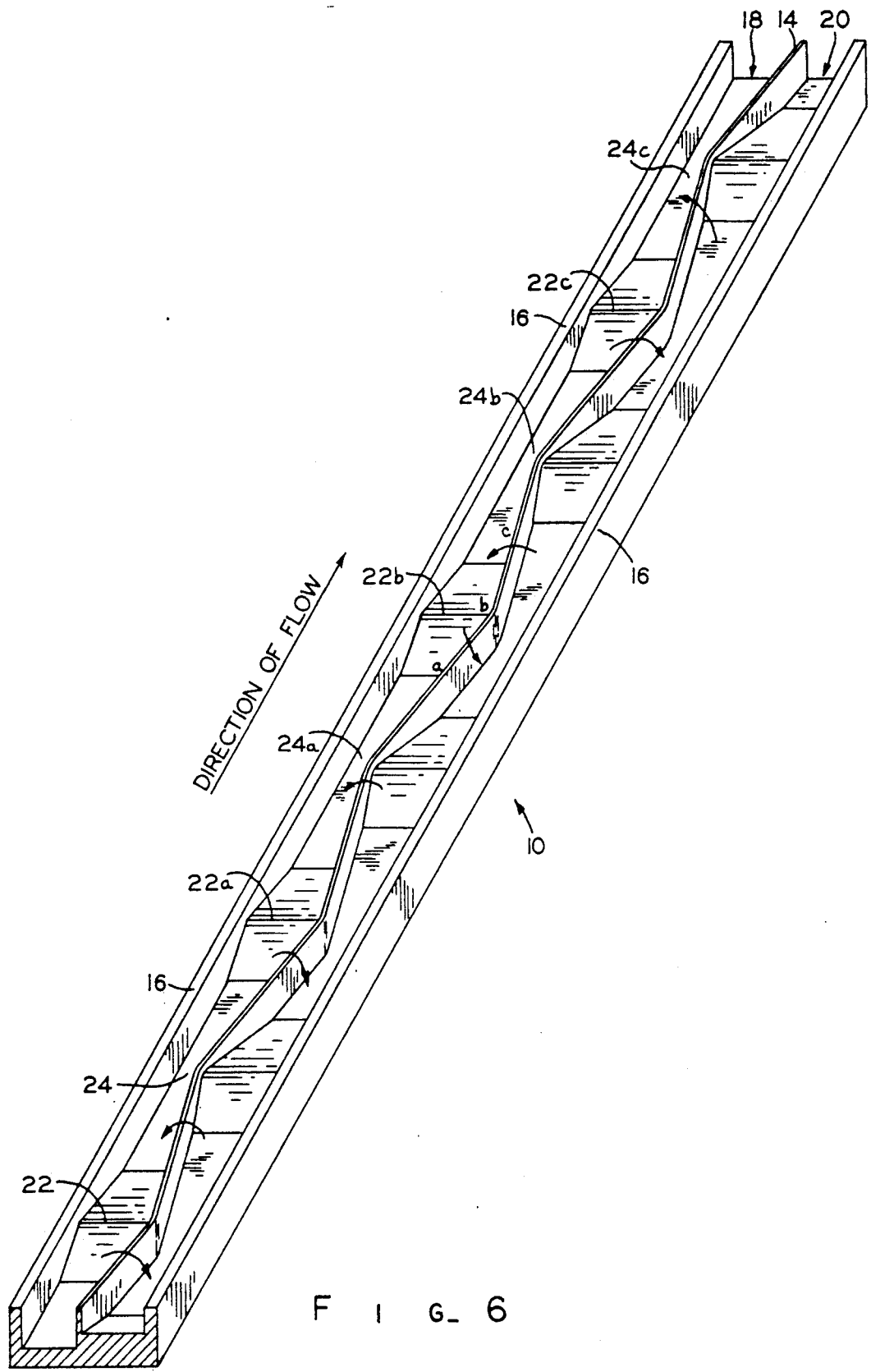
FIG. 6 is a perspective unwrapped channel view of the wave section depicted in FIG. 1.

The portions of a typical extruder are well known to persons skilled in the art, and are disclosed in U.S. Pat. Nos. 3,870,284 and 4,173,417, both of which are assigned to the assignee of the present invention and incorporated herein by reference. The invention can also be incorporated in injection molding machines. It will be recognized that numerous variations are possible; however, such variations are not particularly significant as far as the present invention is concerned, and they need not be referred to in detail here.

FIG. 1 relates to an extruder screw used in a typical plasticating extruder machine wherein the wave screw metering section 10, which may be of the single or double stage, is rotatably disposed in barrel 12. A helical barrier land or flight 14 divides the flow passage formed by conveying land or flight 16 of screw 10 into two adjacent channels 18 and 20.

Each of channels 18 and 20 has a wave-like pattern. That is, the depth of each channel (i.e., the distance from the outer edge of the conveying flight to the channel base) varies so that wave crests are formed periodically along each channel. Each wave crest constitutes a channel section of restricted depth. Between wave crests are disposed deeper valley portions. In FIGS. 3 and 5, a crest portions 22 and 23 of channels 18 and 20, respectively, and valley portions 24 and 25 of channels 18 and 20, respectively, are depicted. Like wave crests and valleys 23a, 23b, 24a, 24b, etc., are designated in the drawings by related reference numerals.

It is realized that the wave crests are formed by a base surface portion of maximum radius, and the valleys are formed by a base surface portion of minimum radius. Although the wave crests and valleys are illustrated in FIGS. 2 and 6 as having sharply defined changes in elevation, these crests and valleys may be more rounded for ease of machining. Adjacent channels 18 and 20 are arranged wherein the wave crests are offset helically, so that a wave crest of one channel lies adjacent a valley portion of the other channel. In this fashion, melt can be effectively transferred across the barrier land from the channel containing the wave crest to the channel containing the valley.

Channel wave profiles 22 and 24 may be formed in any suitable manner. For example, the wave profiles may be of continuously varying depth, or of the so-called "flat bottom" type, which are known in the art and disclosed in column 6 of U.S. Pat. No. 4,173,417. The adjacent flat bottom channels 18 and 20 are arranged so that wave crest 22 of channel 18 lies adjacent to valley portion 25 of adjacent channel 20, as depicted in FIG. 2.

In the embodiment disclosed, each wave cycle extends for 360° along the channel, there preferably occurring at least four wave cycles in each channel to minimize pressure fluctuations at the screw tip. Other arrangements, of course, are possible such as spacing the protrusions of each wave cycle by 540°, with an equal number of wave crests disposed on each side of a given channel for balanced distribution along the screw.

Referring to FIGS. 1 and 2, it is noted that the width of the outer edge of barrier flight 14 is substantially less than the width of the outer edge of conveying flight 16. More particularly, the barrier flight width is preferably less than 8% of the conveying screw pitch lead and most preferably lies within the range of from about 1% to 4% of that pitch. In this fashion, the barrier flight is narrow, and little shearing action is imposed upon the melt which is transferred across the barrier flight, thereby avoiding excessive energy input, and thus heating, of the melt. This contributes significantly to the acceptable temperatures and temperature variances exhibited by the present invention.

To permit widening of the wave crests and deepening of the valleys to avoid flow restriction therein, the undercut barrier flight according to the present invention has a zig-zag shape as shown in FIGS. 1, 2 and 6. As shown in FIG. 2, barrier 14 extends linearly in the direction of the channel 20 from wave crest 23 of channel 20 at line 3—3 to valley 25 of channel 20 at line 4—4, thus proportionately decreasing the width of channel 20 from wave crest 23 to valley 25. FIGS. 3 and 4 illustrate this decreased width of channel 20 and further illustrate the corresponding increased width of channel 18 along the same path.

At line 4—4 of FIG. 2, the barrier 14 turns back in the direction of channel 18, thus again increasing the width of channel 20 and proportionately decreasing the width of channel 18. As illustrated in FIGS. 2, 3 and 5, the barrier repeats its zig-zag motion at each wave cycle. Although FIGS. 2 and 6 illustrate barrier 14 as having sharp corners, these corners may be rounded for ease in machining.

To describe the action of metering section 10, the flow of polymer delivered along the section is considered. Material is conveyed by the rotational action of the upstream, conventional part of the screw and is delivered to the start of metering section 10 at the lower portion of FIG. 6. The initiation of barrier flight 14 at a point causes division of the flow, with a portion passing into channel 18 and the remainder passing into channel 20. At different points thereafter along screw 10, material cross-flow occurs from compression regions formed at wave crest 22 to decompression regions of valleys 24 along the various undercut regions of barrier flight 14. For example, cross-flow occurs along a-b from channel 18 to channel 20, and along b-c from channel 20 to channel 18. Arrows have been drawn to indicate the cross-flow paths, and it is evident that cross-flow occurs in two different senses, i.e., from channel 18 into channel 20, or from channel 20 into channel 18. The former flow type, which is indicated by right pointing arrows, is a back flow since it produces mixing in the spatially backward direction, while the latter flow type, which is indicated by left pointing arrows, is termed a forward flow because it produces mixing in the spatially forward direction. It should be noted that both types of flow occur over the same undercut in the fully developed section.

The zig-zag design offers several benefits over the constant pitch central undercut barrier. First, as shown in FIGS. 3 through 5, the wave crests are all about 50% wider than those of the constant pitch central undercut barrier. This permits 50% more flow over the crest under comparable shear conditions. Although the adjacent deep channel across the undercut barrier must be correspondingly narrow, it is deep enough to avoid being a restriction to flow. Second, the repetitive zig-zag cyclic waves create more flow patterns, which enhance the mixing and melting rates.

It is noted that a benefit may be derived from progressively reducing wave crest clearances for the first several wave cycles; however, subsequent waves should be cyclic whenever metering uniformity is an important consideration. In addition, it is recognized that an increase in wave crest width of 50% versus a conventional twin channel wave is a preferred reasonable upper limit for positioning the central undercut barrier. If the wave crests are widened to a greater extent, the deep channels may become too narrow and adversely affect performance.

Although barrier flight 14 has been described as having a linear zig-zag design, other arrangements are possible. Possible variations include a non-linear barrier flight, a constantly varying channel depth, and a linear flight of which a portion is parallel to the conveying flight.

While this invention has been described as having a preferred design, it will be understood that it is capable of further modification. This application is therefore intended to cover any variations, uses, or adaptations of the invention following the general principles thereof and including such departures from the present disclosure as come within known or customary practice to which this invention pertains and fall within the limits of the appended claims.

What is claimed is:

1. A plasticating apparatus comprising:
   a barrel having an inlet and an outlet; and
   a rotatable screw disposed within and cooperating with an inner wall of said barrel, said screw adapted for plasticating resinous material fed into said barrel through said inlet;
   said screw having a helical passage formed by a conveying flight to transport resinous material from said inlet toward said outlet;
   said screw having a section for mixing and melting the resinous material, said section including a helical, zig-zag barrier flight spaced from said conveying flight to divide said passage into channels extending helically adjacent along said section, each of said channels having a depth which varies cyclically in a helical direction of such channel, the minimum depth portions of the channels on opposite sides of said barrier flight defining wave crests which are displaced helically from each other, said barrier flight having a first segment converging toward one side of said conveying flight, and a second segment diverging away from said one side of said conveying flight, there being a plurality of said converging first and diverging second segments repeating throughout said mixing section, the width of each of said channels, which is defined by said barrier flight and said conveying flight, decreasing from each of said wave crests to its adjacent downstream valley and said width increasing from each of said valleys to its adjacent downstream wave crest.

2. The apparatus of claim 1 wherein the outer width of said barrier flight is narrower than that of said conveying flight.

3. The apparatus of claim 2 wherein the outer width of said barrier flight lies within a range from about 1% to about 4% of the outer width of said conveying flight.

4. The apparatus of claim 1 wherein each of said channels has a base surface whose radius from the screw axis of rotation varies cyclically through at least four cycles along the helical length of each such channel to from the varying channel depth.

5. The apparatus of claim 1 wherein each of said channel cycles includes an area of increasing channel depth, an area of decreasing channel depth, and an area of constant channel depth, and wherein each wave crest in one of said channels is disposed adjacent an area of constant depth in the other channel.

6. The apparatus of claim 1 wherein the width of each of said channels is greatest at each wave crest and smallest at each valley.

7. The apparatus of claim 6 wherein the width of each said wave crest is no more than 50% greater tan said wave crest for a central pitch undercut barrier flight.

8. The apparatus of claim 1 wherein said first and second segments are substantially contiguous.

9. A screw for plasticating plastic material, said screw including a mixing section comprising:
a helical passage formed by a conveying flight to transport resinous material, said screw having a section for mixing and melting the resinous material, said section including a helical, zig-zag barrier flight spaced from said conveying flight to divide said passage into channels extending helically adjacent along said section, each of aid channels having a depth which varies cyclically in a helical direction of such channel, the minimum depth portions of the channels on opposite sides of said barrier flight defining wave crests which are displaced helically from each other, said barrier flight having a first segment converging toward one side of said conveying flight, and a second segment diverging away from said one side of said conveying flight, there being a plurality of said converging first and diverging section segments repeating through said mixing section, the width of each of said channels, which is defined by said barrier flight and said conveying flight, decreasing from each of said wave crests to its adjacent downstream valley and said width increasing from each of said valleys to its adjacent downstream wave crest.

10. The apparatus of claim 9 wherein the outer width of said barrier flight is narrower than that of said conveying flight.

11. The apparatus of claim 9 wherein the outer width of said barrier flight lies within a range from about 1% to about 4% of the outer width of said conveying flight.

12. The apparatus of claim 9 wherein each of said channels has a base surface whose radius from the screw axis of rotation varies cyclically through at least four cycles along the helical length of each such channel to form the varying channel depth.

13. The apparatus of claim 9 wherein each of said channel cycles includes an area of increasing channel depth, an area of decreasing channel depth, and an area of constant channel depth, and wherein each wave crest in one of said channels is disposed adjacent an area of constant depth in the other channel.

14. The apparatus of claim 9 wherein the width of each of said channels is greatest at each wave crest and smallest at each valley.

15. The apparatus of claim 14 wherein the width of each said wave crest is no more than 50% greater than said wave crest for a central pitch undercut barrier flight.

16. The apparatus of claim 9 wherein said first and second segments are substantially contiguous.

* * * * *

UNITED STATES PATENT AND TRADEMARK OFFICE
CERTIFICATE OF CORRECTION

PATENT NO.   :   5,035,509

DATED        :   July 30, 1991

INVENTOR(S)  :   George A. Kruder

It is certified that error appears in the above-identified patent and that said Letters Patent is hereby corrected as shown below:

Column 9, claim 4, line 14, delete "from" and substitute therefor --form--.

Column 9, claim 7, line 25, delete "tan" and substitute therefor --than--.

Column 9, claim 9, line 37, delete "aid" and substitute therefor --said--.

Signed and Sealed this

Twelfth Day of January, 1993

*Attest:*

DOUGLAS B. COMER

*Attesting Officer*    *Acting Commissioner of Patents and Trademarks*